No. 820,350. PATENTED MAY 8, 1906
M. S. CONNER.
SIGNALING SYSTEM FOR TELEPHONE TRUNK LINES.
APPLICATION FILED APR. 9, 1900. RENEWED OCT. 5, 1905.
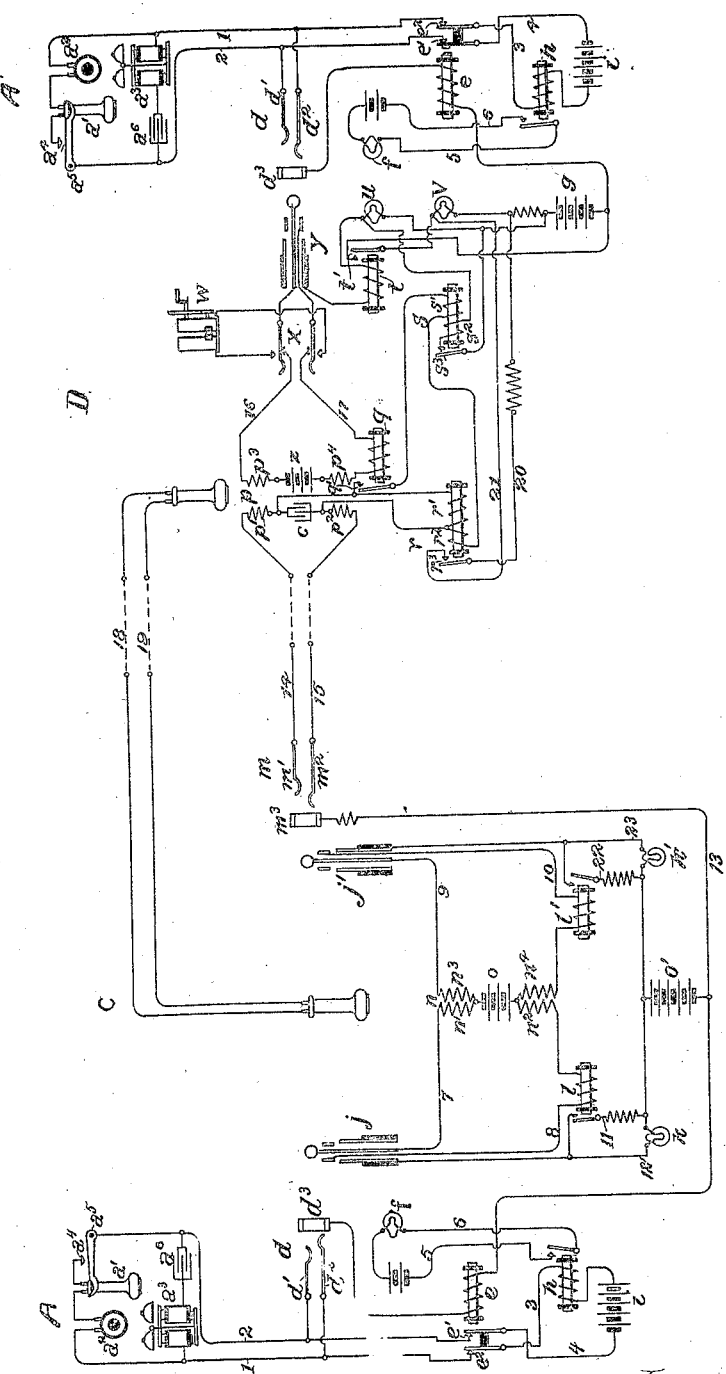
Witnesses:
J. W. Hinkler
W. H. Leach
Inventor:
Merritt S. Conner,
By George P. Barton
Attorney.

UNITED STATES PATENT OFFICE.

MERRITT S. CONNER, OF CHICAGO, ILLINOIS, ASSIGNOR TO WESTERN ELECTRIC COMPANY, OF CHICAGO, ILLINOIS, A CORPORATION OF ILLINOIS

SIGNALING SYSTEM FOR TELEPHONE TRUNK-LINES.

No. 820,350. Specification of Letters Patent. Patented May 8, 1906.

Application filed April 9, 1900. Renewed October 5, 1905. Serial No. 282,063.

*To all whom it may concern:*

Be it known that I, MERRITT S. CONNER, a citizen of the United States, residing at Chicago, in the county of Cook and State of Illinois, have invented a certain new and useful Improvement in Signaling Systems for Telephone Trunk-Lines, of which the following is a full, clear, concise, and exact description.

My invention concerns the operation of signals in connection with trunk-lines between offices of telephone-exchanges. It is a device for preventing interference with the operation of the signals by currents arising from sources foreign to the signaling-circuit, such as differences of potential in the earth at the different exchanges, also for preventing interference with conversation by currents of such periodicity as to cause audible vibrations in the telephone-receiver, which arise from any difference in the electrical conditions of the earth at the different exchanges or from inductive action upon imperfectly-balanced lines.

It is well known in the art of telephony that in the vicinity of electric railways or other systems of electrical appliances employing electric currents and connected at various points with the earth differences of electrical potential are found at different localities, which of course produce or tend to produce currents through conductors, such as telephone-lines, which happen to connect these different points. The differences of potential between different localities in the vicinity of electric railways or other electric circuits employing grounded returns not infrequently rise above the electromotive forces commonly used for signaling purposes in telephone-exchanges. Hence when two exchanges are connected by a metallic trunk over which, due to the present state of the art, it is necessary to operate two separate signals, and when this is accomplished by employing each conductor for a separate circuit having return through the earth, the extraneous current is likely to find a circuit through the trunk-line from one exchange to the other and operate the signals associated with the trunk-line circuit. As these signals are usually automatic in operation and their indications are accepted as final by the operators, great inconvenience and confusion in the connection and disconnection of lines may be occasioned by such interference. Also in such trunk-lines having a ground at each end considerable trouble is experienced in some localities on account of interference sounds or noises on the line, which greatly impairs telephone conversation. This is due either to the proper frequency of the currents arising from the different electrical potentials of the earth at various points which pass over the trunk-lines or to the fact that such currents may come to the trunk-line by induction from other grounded circuits. This is true even if the trunk-line be so constructed that its two conductors form a neutral or non-inductive circuit, for if its two ends are grounded each conductor with its return ground forms a mutually-inductive circuit with every other circuit having the same return.

By the circuits and apparatus of my invention the usual automatic signaling over trunk-lines can be accomplished and interference from extraneous currents avoided. This is preferably done without employing the earth as a part of the signaling-circuits, though ground-return signaling-circuits may be used without departing from some features of my invention.

Generally speaking, the preferred embodiment of my invention consists in a circuit containing a source of electrical energy and two signals, with means for controlling the operation of such. The first of these signals (or means for controlling a signal) is of such electrical resistance and construction that when the two are placed in the circuit with the source of electrical energy it will permit of the passage of enough current to be operative itself, but not of enough to operate the second signal.

My invention consists, further, of means for shunting the high-resistance signal (or means for controlling a signal) so as to permit enough current to flow to operate the second signal, while at the same time maintaining the shunted signal in its operative condition.

My invention also contemplates suitable means for opening the above circuit or otherwise rendering the high-resistance signal inert, also of means for opening the above circuit or of placing in it enough resistance to permit of the non-operation of the first signal.

Other embodiments of my invention may be readily made without departing from its spirit.

I will explain my invention more particularly by reference to the accompanying drawing, which illustrates so much of a telephone-exchange system as is necessary to understand the application of the invention.

A and A' are two substations, each provided with the usual receiver $a'$, transmitter $a^2$, switch-hook $a^5$, call-bell $a^3$, and condenser $a^6$. These stations are connected by lines 1 and 2 to spring-jacks $d$ in exchanges C and D, respectively. At the central office C there are a pair of switch-plugs $j$ and $j'$, which are provided with the proper terminals to engage the contact parts $d'$, $d^2$, and $d^3$ of the jack $d$ and the contact-pieces $m'$, $m^2$, and $m^3$ of the jack $m$. Conductors 7 and 8 connect the central battery $o$ with the tip and ring of the answering-plug $j$, while conductors 9 and 10 connect the same battery with the tip and ring of the connecting-plug $j'$. Windings $n'$ and $n^2$ of a repeating-coil are included in circuit with conductors 7 and 8, while other windings $n^3$ and $n^4$ of the same coil are included in circuit with conductors 9 and 10. Conductors 8 and 10 also include the helices of the magnets $l$ and $l'$, which are provided each with an armature and contact-anvil, which control the supervisory signals $k$ and $k'$, respectively. The pair of switching-cords would, of course, also be provided with the usual listening-key for connecting the operator's telephone with the circuit.

Between the offices C and D extends a trunk-line 14 15. This trunk-line terminates at the office C in a spring-jack $m$, provided with contact-pieces for engaging the connecting-plug at C. At the station D the trunk-line includes in circuit the windings $p'$ and $p^2$ of a repeating-coil $p$ and the winding $r'$ of the magnet $r$, with the condenser $c$ bridged across. The winding $r'$, should be of very high resistance—say ten thousand ohms. Associated with windings $p'$ and $p^2$ are windings $p^3$ and $p^4$ of the same coil, which are included in the circuit with the central battery $z$, through the conductors 16 and 17, which include also the winding of the magnet $q$ and the ringing-key $x$, and terminate in the tip and ring contact-pieces of the plug $y$.

A shunt-circuit composed of the contact-anvil and armature of the magnet $q$, the winding $s'$ of the magnet $s$, and the winding $r^2$ of the magnet $r$ is placed around the winding $r'$ of the magnet $r$. Magnet $r$ is provided with a contact-anvil and an armature, which, together with the contact-anvil and armature of the magnet $t$, control the disconnecting-signal $v$. Magnet $s$ is provided with a contact-anvil, an armature, and a winding $s^2$, which, together with the terminal of the plug $y$ and the contact-piece of the jack $d$, control the ringing-signal $u$. The association of the repeating-coils and central battery, together with the key, ringing-generator, the ringing-signal $u$, and means for operating it shown, is well known to those skilled in the art.

I have not deemed it necessary to show an operator's telephone outfit, as its association with the cord-circuit is well understood by those skilled in the art.

Having thus particularly described the details of one embodiment of my invention and a telephone system in connection with which the same is adapted to be employed, I will now describe the operation thereof.

Let it be assumed that subscriber at station A demands connection with station A' of office D. After receiving the call by means of line-signal $f$ in the usual way, inserting the plug $j$ into the spring-jack $d$, and receiving orally the order of the subscriber at station A the operator at office C inserts plug $j'$ into the spring-jack $m$ and at the same time by means of the order-wire circuit 18 19 requests the operator at the office D to connect the trunk-line terminating at the office D in plug $y$ with the line to the required station A'. When the operator at C places plug $j$ in spring-jack $d$, the central battery $o$ finds circuit through the contact-pieces of the plug $j$ and jack $d$ onto the line 1 2, and the receiver $a'$ being taken from the switch-hook $a^5$ the contact $a^4$ is closed, thus energizing magnet $l$, closing its contact, which shunts out the signal $k$, although its circuit has been completed by means of the plug $j$ and the spring-jack $d$ through the winding of magnet $e$ to the battery $o'$. When the plug $j'$ is inserted in the spring-jack $m$, the battery $o$ finds a circuit out over the line 14 15 through windings $p'$ and $p^2$ of the repeating-coil $p$ and the winding $r'$ of magnet $r$, energizing that magnet and closing the contact $r^3$. The winding $r'$ of magnet $r$, however, is of so great electrical resistance that it does not allow enough current to flow in the circuit to energize the magnet $l'$ sufficiently to close its contact. The signal $k'$ therefore remains displayed, its circuit having been completed with the battery $o'$ through the plug $j'$ and the spring-jack $m$. When the plug $y$ is inserted into the spring-jack $d$, the signal $u$ is displayed, its circuit being completed with the battery $g$ through the winding of magnet $t$, the plug $y$, the jack $d$, and the winding of magnet $e$. The circuit of the signal $v$ is also completed by the closing of the contact $t'$, due to the energization of the magnet $t$. The signal $v$, however, is not displayed, owing to the maintenance of the shunt 20 21 about it by the closed contact $r^3$. The operator at office D then calls the station A' by means of the generator $w$, the key $x$, and the call-bell $a^3$. When the subscriber at station A' removes the receiver $a'$ from the hook $a^5$, the contact $a^4$ is closed. The closure of the contacts completes the circuit from the battery $z$ through the winding of magnet $q$, energizing it sufficiently to close the contact $q'$. The contact $q'$ in turn places a comparatively low resistance shunt composed of the winding $s'$ of the magnet $s$ and of the winding $r^2$ of the magnet $r$ around the winding $r'$ of the magnet $r$, permitting the passage of enough current over the trunk-line from the battery $o$ to energize the magnet $l'$ sufficiently to close its contact, thus shunting out the signal $k'$ by the shunt 22 23. The armature of the magnet $r$ is still attracted, partly in virtue of the resistance in the shunt and partly because the winding $r^2$ energizes $r$ by the current which passes through the shunt. At the same time the magnet $s$ is energized by the winding $s'$ and closes the contact $s^3$, which in turn shunts out the signal $u$ by the winding $s^2$. Also the contact $s^3$ is maintained by the winding $s^2$ until the withdrawal of the plug $y$ from the jack $d$ irrespective of the subsequent condition of winding $s'$. When the subscribers have finished talking, the receiver $a'$ at A is hung on switch-hook $a^5$, thus opening the contact $a^4$, which in turn deënergizes magnet $l$, allowing its contacts to open the shunt which they control, thus displaying signal $k$. In the same manner the subscriber at A' effects the opening of the contact $q'$ at office D, whereby the low-resistance shunt of the winding $r'$ of the magnet $r$ is removed, thus sufficiently deënergizing $l'$ to permit of the opening of its contacts, which permits of the displaying of signal $k'$ by the removal of the shunt 22 23. Observing the signals $k$ and $k'$, the operator at C removes plug $j$ from the spring-jack $d$ and plug $j'$ from spring-jack $m$. The last-mentioned act deënergizes magnet $r$, allowing contact $r^3$ to open, removing the shunt 20 21 from the signal $v$ and causing its display. The display of the signal $v$ instructs the operator at D to take down the plug $y$, which act restores the signal $v$ to its normal condition by the opening of contact $t'$, due to the deënergization of the magnet $t$.

In the claims I use the term "signaling instrument" in the sense of any electromagnetic signaling device or any electromagnetic means for controlling a signaling device.

It is obvious that the shunt-circuit around the winding $r'$ of the magnet $r$ may be opened and closed by any other means than the magnet $q$, that this shunt need not consist of the winding $s'$ of the magnet $s$ and the winding $r^2$ of the magnet $r$, but may be any other electrical resistance, and that it need not consist of or contain a winding on the magnet $r$. It is also obvious that the magnet $r$ may be deënergized in other ways than opening the circuit including the same. I therefore do not wish to be limited to the precise mechanism and system of circuits herein described; but, Having described my invention, I claim as new, and desire to secure by Letters Patent, together with all modifications that may be made by those skilled in the art, the following:

1. The combination with telephone-lines and a trunk-line for uniting them, of a signal in the trunk-line and a source of current in a bridge thereof at one terminal station; a repeating-coil at the other terminal, said trunk-line being severed and having its severed terminals united through the windings of the repeating-coil to form two conductively-separated but inductively-continuous circuits, and a high-resistance signal-controlling magnet in the portion of the trunk-line leading to the first-mentioned office, the said resistance being sufficient to prevent the operation of the signal in the circuit therewith; a source of current and a relay-magnet in the other portion of the trunk-line adapted for connection with the called line, and a shunt of the high-resistance signal-controlling magnet controlled by said relay, as described.

2. The combination with telephone-lines having switches adapted to close the line-circuits while the telephones are in use, said lines entering different central offices, and a trunk-line for uniting said lines; a supervisory signal in the trunk-line and a source of current in a bridge thereof at one of the offices; a repeating-coil at the other office, the trunk-line thereat being severed, the terminals of the wires leading to the first-mentioned station being united through one set of windings of the repeating-coil, and the terminals of the wires adapted for connection with the called line being united through the other set of windings of the repeating-coil, and a source of current and a relay in the last-mentioned portion of the trunk-line; a high-resistance magnet in the trunk-line in circuit with the aforesaid supervisory signal, a clearing-out signal controlled by said high-resistance magnet, a shunt about said high-resistance magnet, and an auxiliary winding of the magnet therein, said shunt being controlled by the relay in the other portion of the trunk-circuit, substantially as described.

3. The combination with a trunk-line having a source of energy, a signaling instrument and means for closing the circuit at one terminal station, of a high-resistance signaling instrument bridged across the line at another terminal station, a telephone-line, provided with a switch at the substation for closing the line, in connection with the trunk-line, and a shunt-circuit controlled by the switch at the telephone-substation around the winding of said high-resistance signaling instrument, whereby the signaling instrument at the first terminal station of the trunk-line is responsive to the opening and closing of the switch at the subscriber's substation without interfering with the operation of the high-resistance signaling instrument, substantially as described.

4. The combination, with a connecting-cord containing a source of energy, a signaling instrument and a terminal plug, a trunk-line terminating in a spring-jack at the same station with the connecting-cord, a plug at another station, a repeating-coil having its windings interposed in the trunk-line between said plug and spring-jack, a high-resistance signaling instrument in circuit with the portion of the trunk-line extending to said spring-jack, a shunt-circuit around said high-resistance signaling instrument, and means for controlling said shunt to control the signaling instrument at the distant station of the trunk-line, substantially as described.

5. The combination with a telephone-line, of a trunk-line and a switch for uniting said trunk-line with the telephone-line, a signaling instrument at one terminal of the trunk-line, a source of current connected with the trunk-line, a high-resistance signaling instrument in a bridge of the trunk-line at the other terminal thereof, a shunt about said high-resistance signaling instrument, said shunt controlling the operation of the first-mentioned signaling instrument, and a switch at the substation of said line controlling said shunt.

6. The combination with a telephone-line, of a trunk-line, a switch for uniting said trunk-line with said telephone-line, a source of current in a bridge of the trunk-line at one terminal thereof, a high-resistance signaling instrument $r$ in a bridge of the trunk-line at the other terminal, a signal instrument $l'$ in said trunk-line between the source of current and the signaling instrument $r$, a shunt around said high-resistance signal instrument, a switch at the substation of said telephone-line controlling said shunt, and a signaling instrument $s$ in the shunt; whereby both signaling instruments $l'$ and $s$ are excited when said shunt is closed.

7. The combination with a signaling-circuit including a source of current, a relay $l'$ and a switch for closing said circuit, a signal $k'$ and a circuit therefor, controlled by relay $l'$, a high-resistance relay $r$ included in said signaling-circuit, a signal $v$, a circuit therefor, controlled by said high-resistance relay, a shunt around the winding of said high-resistance relay, a relay $s$ in said shunt, a signal $u$, a circuit therefor, controlled by said relay, a relay $q$ adapted when energized to close the shunt about relay $r$, a circuit for said relay $q$, and a switch controlling said circuit; whereby upon the closure of the shunt about said high-resistance relay, both relays $s$ and $l'$ are excited to shunt out the signals associated therewith.

8. The combination with a telephone-line, of a trunk-line having a source of current connected therewith, a switch for uniting said trunk-line with said telephone-line, a signal instrument at one terminal of the trunk-line, a high-resistance signaling instrument in the trunk-line for controlling the operation of the first-mentioned signaling instrument, a shunt about said high-resistance signaling instrument, and a switch at the substation for controlling said shunt.

9. The combination with telephone-lines and a trunk-line for uniting them, said trunk-line having a source of current connected therewith, of a signal in the trunk-line at one terminal station, means for conductively separating said trunk-line into inductively-continuous parts, a high-resistance signal-controlling magnet in the trunk-line, said resistance being sufficient to prevent the operation of said signal, a shunt of said magnet, and a relay in the trunk-line adapted when said trunk-line is connected with the called line to control said shunt.

In witness whereof I hereunto subscribe my name this 24th day of May, A. D. 1899.

MERRITT S. CONNER.

Witnesses:
 ELLA EDLER,
 DUNCAN E. WILLETT.